United States Patent
Fang et al.

(10) Patent No.: US 7,420,992 B1
(45) Date of Patent: Sep. 2, 2008

(54) ADAPTIVE NETWORK TRAFFIC COMPRESSION MECHANISM INCLUDING DYNAMIC SELECTION OF COMPRESSION ALGORITHMS

(75) Inventors: Li Fang, San Jose, CA (US); Mary Louise Laier, Cupertino, CA (US)

(73) Assignee: Packeteer, Inc., Cupertino, CA (US)

( * ) Notice: Subject to any disclaimer, the term of this patent is extended or adjusted under 35 U.S.C. 154(b) by 538 days.

(21) Appl. No.: 11/082,638

(22) Filed: Mar. 17, 2005

(51) Int. Cl.
*H04J 3/18* (2006.01)

(52) U.S. Cl. ................ 370/477; 370/521; 375/240; 709/247

(58) Field of Classification Search ............. 370/464, 370/465, 466, 474, 476, 477, 521; 375/240; 341/51; 709/247
See application file for complete search history.

(56) References Cited

U.S. PATENT DOCUMENTS

| | | | |
|---|---|---|---|
| 4,730,348 A * | 3/1988 | MacCrisken | ........... 375/240 |
| 5,045,852 A | 9/1991 | Mitchell et al. | |
| 5,280,600 A | 1/1994 | Van Maren et al. | |
| 5,389,922 A | 2/1995 | Seroussi et al. | |
| 5,467,087 A | 11/1995 | Chu | |
| 5,521,940 A * | 5/1996 | Lane et al. | ........... 370/474 |
| 5,870,036 A | 2/1999 | Franaszek et al. | |
| 5,949,355 A | 9/1999 | Panaoussis | |
| 6,008,743 A | 12/1999 | Jaquette | |
| 6,624,761 B2 | 9/2003 | Fallon | |
| 6,856,651 B2 * | 2/2005 | Singh | ........... 375/240 |
| 6,999,429 B1 * | 2/2006 | Hannu et al. | ........... 370/474 |

* cited by examiner

*Primary Examiner*—Ricky Ngo
*Assistant Examiner*—Pao Sinkantarakorn
(74) *Attorney, Agent, or Firm*—Baker Botts L.L.P.

(57) ABSTRACT

An adaptive compression mechanism that dynamically selects compression algorithms applied to network application traffic to improve performance. One implementation includes an arbitration scheme that reduces the impact on computing resources required to analyze different compression algorithms for different network applications. The adaptive compression functionality of the present invention can be integrated into network application traffic management or acceleration systems.

10 Claims, 6 Drawing Sheets

ADAPTIVE NETWORK TRAFFIC COMPRESSION MECHANISM INCLUDING DYNAMIC SELECTION OF COMPRESSION ALGORITHMS

CROSS-REFERENCE TO RELATED APPLICATIONS

This application makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, now U.S. Pat. No. 6,456,360, in the name of Robert L. Packer, Brett D. Galloway and Ted Thi, entitled "Method for Data Rate Control for Heterogeneous or Peer Internetworking;"

U.S. patent application Ser. No. 09/710,442, in the name of Todd Krautkremer and Guy Riddle, entitled "Application Service Level Mediation and Method of Using the Same;"

U.S. patent application Ser. No. 09/966,538, in the name of Guy Riddle, entitled "Dynamic Partitioning of Network Resources;"

U.S. patent application Ser. No. 10/015,826 in the name of Guy Riddle, entitled "Dynamic Tunnel Probing in a Communications Network;"

U.S. patent application Ser. No. 10/039,992, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/178,617, in the name of Robert E. Purvy, entitled "Methods, Apparatuses and Systems Facilitating Analysis of Network Device Performance;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, in the name of Brett Galloway and George Powers, entitled "Classification Data Structure enabling Multi-Dimensional Network Traffic Classification and Control Schemes;"

U.S. patent application Ser. No. 10/334,467, in the name of Mark Hill, entitled "Methods, Apparatuses and Systems Facilitating Analysis of the Performance of Network Traffic Classification Configurations;"

U.S. patent application Ser. No. 10/453,345, in the name of Scott Hankins, Michael R. Morford, and Michael J. Quinn, entitled "Flow-Based Packet Capture;"

U.S. patent application Ser. No. 10/676,383 in the name of Guy Riddle, entitled "Enhanced Flow Data Records Including Traffic Type Data;"

U.S. patent application Ser. No. 10/720,329, in the name of Weng-Chin Yung, Mark Hill and Anne Cesa Klein, entitled "Heuristic Behavior Pattern Matching of Data Flows in Enhanced Network Traffic Classification;"

U.S. patent application Ser. No. 10/812,198 in the name of Michael Robert Morford and Robert E. Purvy, entitled "Adaptive, Application-Aware Selection of Differentiated Network Services;"

U.S. patent application Ser. No. 10/843,185 in the name of Guy Riddle, Curtis Vance Bradford and Maddie Cheng, entitled "Packet Load Shedding;"

U.S. patent application Ser. No. 10/938,435 in the name of Guy Riddle, entitled "Classification and Management of Network Traffic Based on Attributes Orthogonal to Explicit Packet Attributes;" and U.S. patent application Ser. No. 11/027,744 in the name of Mark Urban, entitled "Adaptive Correlation of Service Level Agreement and Network Application Performance."

FIELD OF THE INVENTION

The present invention relates to data compression and, more particularly, to an adaptive mechanism that dynamically selects compression algorithms to improve network performance.

BACKGROUND OF THE INVENTION

Businesses are growing increasingly dependent on distributed computing environments and wide area computer networks to accomplish critical tasks. Indeed, a wide variety of business applications are deployed across intranet, extranet and Internet connections to effect essential communications with workers, business partners and customers. As the number of users, applications and external traffic increases, however, network congestion forms, impairing business application performance. Enterprise network managers, therefore, are constantly challenged with determining the volume, origin and nature of network traffic to align network resources with business priorities and applications.

Data compression, caching and other technologies that optimize or reduce the size of network traffic flows can be deployed to improve the efficiency and performance of a computer network and ease congestion at bottleneck links. For example, implementing data compression and/or caching technology can improve network performance by reducing the amount of bandwidth required to transmit a given block of data between two network devices along a communications path. Data compression technologies can be implemented on routing nodes without alteration of client or server end systems, or software applications executed therein, to reduce bandwidth requirements along particularly congested portions of a communications path. For example, tunnel technologies, like those used in Virtual Private Network (VPN) implementations, establish tunnels through which network traffic is transformed upon entering at a first network device in a communications path and restored to substantially the same state upon leaving a second network device.

A variety of compression algorithms and technologies have been developed, such as the run-length encoding (RLE), Huffman encoding, Lempel-ziv compression (e.g., LZ77, LZ78, etc.), Lempel-Ziv-Welch (LZW) compression, fixed library compression, and combinations/variants of the foregoing compression methods. All compression methods have their own advantages and tradeoffs. It is generally understood that no single compression method is superior for all applications and data types. The most beneficial choice of compression tools and libraries for a particular network application depends on the characteristics of the data and application in question: streaming versus file; expected patterns and regularities in the data; relative importance of CPU usage, memory usage, channel demands and storage requirements; and other factors.

Given the foregoing, it may often be the case that the selection of a given compression method may not be optimal for a given network application. Prior art technologies, however, do not provide information about the performance or advantages of one compression method relative to other compression methods. Furthermore, the selection of a given compression method will generally be based on an assessment of generalized, historical data and not on actual network traffic that traverses a given network. Network application behavior and, thus, the data transmitted between hosts, however, are not static. For example, if a network application is broadly defined as HTTP or web browsing, the data transmitted between hosts could span a vast array of data types, formats and varying combinations of image and text data. However, the compression method applied to a given network application is statically configured and does not adapt to actual network traffic which may change over time. Accordingly, the selection of a compression algorithm at one point in time may not be optimal at subsequent points in time. Even assuming that a user is able to discover a relatively better compression method for a given network application, the user would have to manually configure one or more network devices to implement the newly desired compression method.

In light of the foregoing, a need exists in the art for methods, apparatuses and systems that dynamically adapt the compression algorithm applied to one or more selected network applications. Embodiments of the present invention substantially fulfill this need.

SUMMARY OF THE INVENTION

The present invention provides methods, apparatuses and systems directed to an adaptive compression mechanism that dynamically selects compression algorithms applied to network application traffic to improve performance. In one implementation, the present invention includes an arbitration scheme that reduces the impact on computing resources required to analyze different compression algorithms for different network applications. In one implementation, the adaptive compression functionality of the present invention can be integrated into network application traffic management or acceleration systems.

DESCRIPTION OF PREFERRED EMBODIMENT(S)

Figure 1:
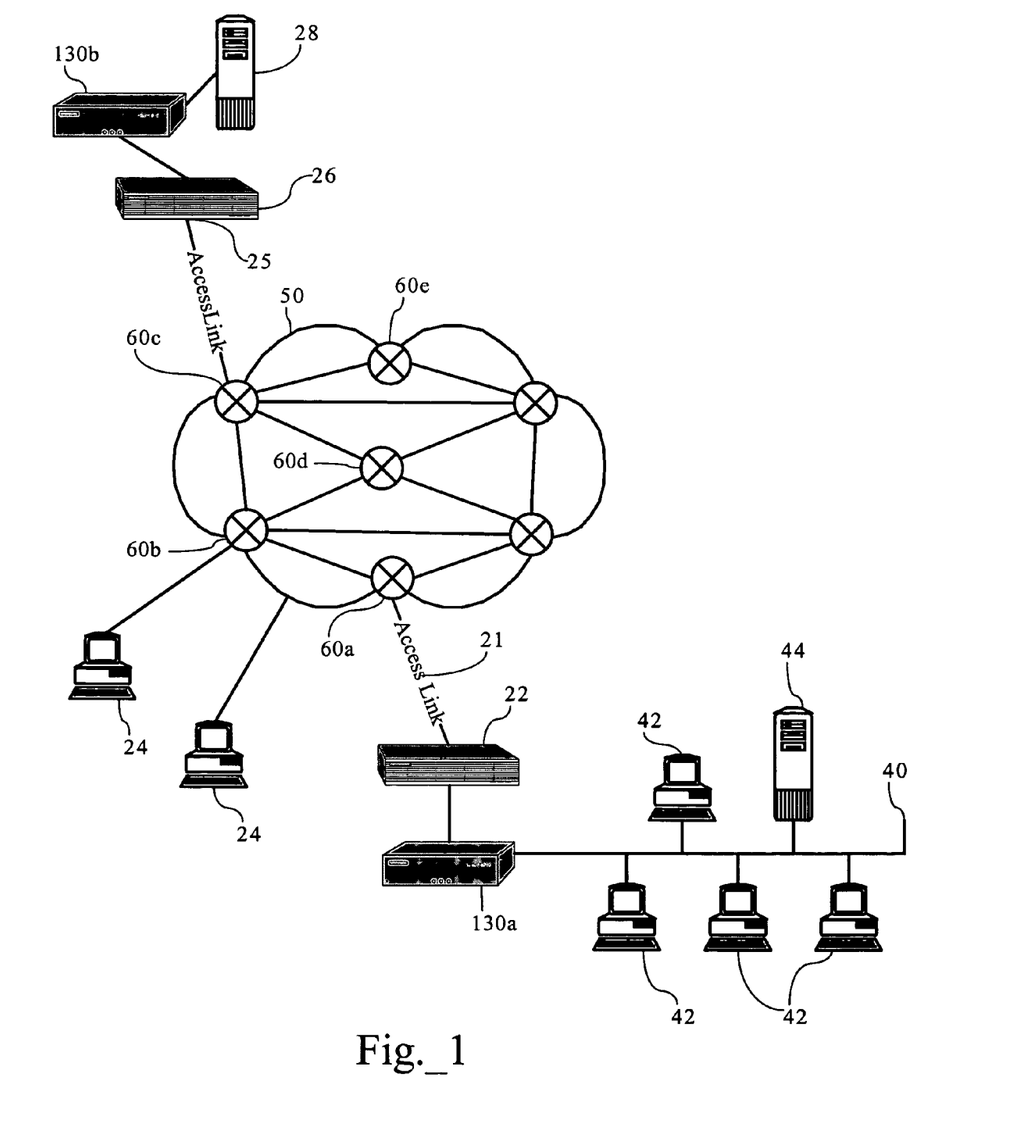
FIG. 1 is a functional block diagram illustrating a computer network system architecture in which an embodiment of the present invention may operate.

FIG. 1 illustrates a packet-based computer network environment including data compression devices 130a, 130b. As FIG. 1 shows, local area computer network 40 interconnects several TCP/IP end systems, including client devices 42 and server device 44, and provides access to resources operably connected to computer network 50 via router 22 and access link 21. Server 28 is a TCP/IP end system connected to computer network 50 through router 26 and access link 25. Client devices 24 are additional TCP/IP end systems operably connected to computer network 50 by any suitable means, such as through an Internet Services Provider (ISP). The computer network environment, including computer network 50 is a packet-based communications environment, employing TCP/IP protocols and has a plurality of interconnected digital packet transmission stations or routing nodes 60a-60e. As FIG. 1 shows, data compression device 130a is provided between router 22 and local area computer network 40, while data compression device 130b is disposed between router 26 and server 28. Data compression devices 130a, 130b are operative to establish a compression tunnels with routing nodes or other network devices in a computer network environment that include compatible compression tunnel capabilities. Data compression devices 130a, 130b, in one implementation, are further operative to identify routing nodes or other network devices (such as each other) along a communications path to a destination host that include compatible compression tunnel capabilities. In one embodiment, data compression devices 130a, 130b are also operable to classify data flows and, depending on the classification, selectively apply different compression algorithms depending on the classification of the data flows.

A. Data Compression Device

Figure 2:
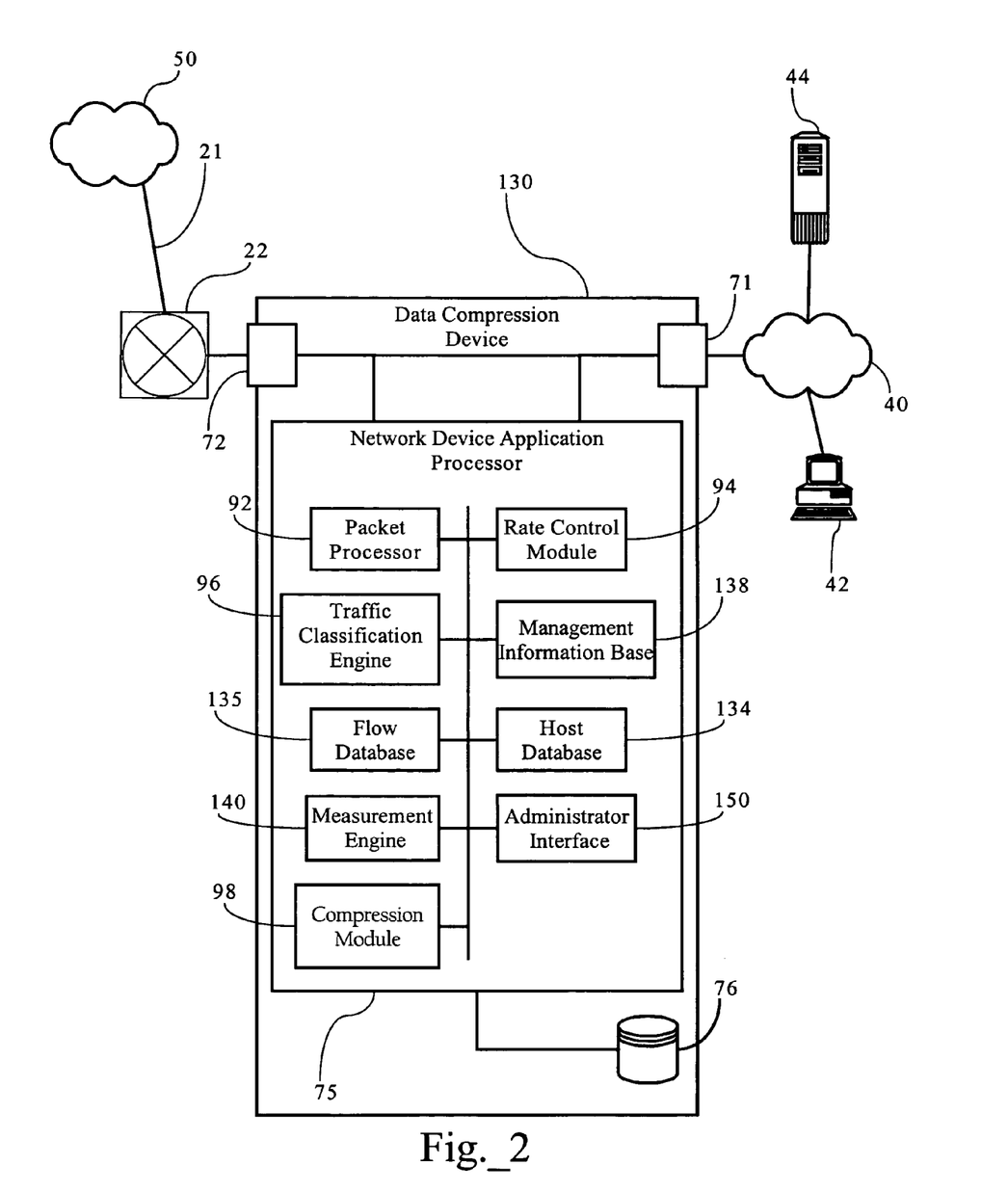
FIG. 2 is a functional block diagram illustrating the functionality of a data compression device, according to one implementation of the present invention.

As FIG. 2 illustrates, data compression device 130, in one implementation, comprises network device application processor 75, and first and second network interfaces 71, 72, which operably connect application traffic management device 130 to the communications path between router 22 and network 40. Network device application processor 75 generally refers to the functionality implemented by data compression device 130, such as network traffic classification, data compression, and the like. In one embodiment, network device application processor 75 is a combination of hardware and software, such as a central processing unit, memory, a system bus, an operating system, device drivers, and one or more software modules implementing the functions performed by application traffic management device 130. For didactic purposes, data compression device 130 is configured to establish tunnels with remote network devices, and compress/de-compress network traffic traversing access link 21. The above-identified patents and patent applications, incorporated by reference herein, disclose various functionalities and features that may be incorporated into data compression devices according to various implementations of the present invention.

In one embodiment, first and second network interfaces 71, 72 are the hardware communications interfaces that receive and transmit packets over the computer network environment. In one implementation, first and second network interfaces 71, 72 reside on separate network interface cards operably connected to the system bus of data compression device 130. In another implementation, first and second network interfaces reside on the same network interface card. In addition, the first and second network interfaces 71, 72 can be wired network interfaces, such as Ethernet (IEEE 802.3) interfaces, and/or wireless network interfaces, such as IEEE 802.11, BlueTooth, satellite-based interfaces, and the like. As FIG. 2 illustrates, data compression device 130, in one embodiment, includes persistent memory 76, such as a hard disk drive or other suitable memory device, such writable CD, DVD, or tape drives. In other implementations, data compression device 130 can include additional network interfaces, beyond network interfaces 71 and 72, to support additional access links or other functionality. Furthermore, U.S. application Ser. No. 10/843,185 provides a description of the operation of various modules (according to one possible implementation of the present invention), such as network interface drivers, and data structures for receiving into memory and processing packets encountered at network interfaces 71, 72.

As FIG. 2 illustrates, network device application processor 75, in one implementation, includes a packet processor 92, rate control module 94, traffic classification engine 96, and compression module 98. Network device application processor 75, in one implementation, further comprises host database 134, flow database 135, measurement engine 140, management information base 138, and administrator interface 150. In one embodiment, the packet processor 92 is operative to process data packets, such as detecting new data flows, parsing the data packets for various attributes (such as source and destination addresses, and the like) and storing packet attributes in a buffer structure, and maintaining one or more flow variables or statistics (such as packet count, current rate, etc.) in connection with the data flows and/or the source/destination hosts. The traffic classification engine 96, as discussed more fully below, is operative to classify data flows based on one or more attributes associated with the data flows. Traffic classification engine 96, in one implementation, stores traffic classes associated with data flows encountered during operation of data compression device 130, as well as manually created traffic classes configured by a network administrator, in a hierarchical traffic class structure. In one implementation, rate control module 94 is operative to schedule data packets for egress from data compression device 130. In one implementation, rate control module 94 is operative to apply aggregate and per-flow bandwidth utilization controls to data flows traversing the access link 21 in the inbound and/or outbound directions. Data compression module 98 is operative to establish compression tunnels with remote network devices along network paths to destination hosts, as discussed more fully below.

As discussed above, in one implementation, network device application processor 75 further comprises measurement engine 140, management information base (MIB) 138, and administrator interface 150. Management information base 138 is a database of standard and extended network objects related to the operation of application traffic management device 130. Measurement engine 140 maintains measurement and statistical data relating to operation of data compression device 130 to allow for monitoring of bandwidth utilization and network performance across access link 21 with respect to a plurality of network statistics on an aggregate and/or per-traffic-class level.

Administrator interface 150 facilitates the configuration of data compression device 130 to adjust or change operational and configuration parameters associated with the device. For example, administrator interface 150 allows administrators to select identified traffic classes and associate them with traffic management policies, such as partitions. In some implementations, administrator interface 150 allows administrators to selectively apply the compression algorithm evaluation functionality to one or more network applications. Administrator interface 150 also displays various views associated with a hierarchical traffic classification scheme and allows administrators to configure or revise the hierarchical traffic classification scheme. Administrator interface 150 can provide a command line interface and/or a graphical user interface accessible, for example, through a conventional browser on client device 42.

A.1. Packet Processing

As discussed above, packet processor 92, in one implementation, is operative to detect new data flows, instantiate data structures associated with the flows and parse packets to identify packet attributes, such as source and destination addresses, port numbers, etc., and populate one or more fields in the data structures. The U.S. patents and patent applications identified above discuss the operation of packet processors that can be incorporated into embodiments of the present invention. In one embodiment, when packet processor 92 encounters a new data flow it stores the source and destination IP addresses contained in the packet headers in host database 134. Packet processor 92 further constructs a control block (flow) object in flow database 135 including attributes characterizing a specific flow between two end systems, such as source and destination port numbers, etc. Other flow attributes in the flow object may include application specific attributes gleaned from layers above the TCP layer, such as codec identifiers for Voice over IP calls, Citrix database identifiers, and the like. Packet processor 92 also stores meta information relating to the received packets in a packet buffer—a memory space, typically in dynamic random access memory (DRAM), reserved for packets traversing data compression device 130. In one embodiment, the packets are stored in the packet buffer with a wrapper including various information fields, such as the time the packet was received, the packet flow direction (inbound or outbound), and a pointer to the flow object corresponding to the flow of which the packet is a part. Other packet wrapper attributes can include fields related to the operation of compression module 98, such as active and passive compression algorithm identifiers, and the like.

In typical network deployments, the majority of data flows are generally TCP or UDP flows. However, any suitable transport layer flow can be recognized and detected. As discussed more fully below, in one embodiment, flows are identified based on the following flow attributes: 1) source IP address, 2) destination IP address, 3) source port number, 4) destination port number, and 5) protocol (derived from the "protocol" field in IPv4 headers, and the "NextHeader" field in IPv6 headers). One skilled in the art will recognize that flows can be identified in relation to a variety of attributes and combinations of attributes. In addition, methods for determining new data flows and assigning packets to existing data flows are well known in the art and also depend on the particular transport layer protocol employed. For a TCP flow, for example, packet processor 92 can determine a new data flow by detecting SYN, SYN/ACK, and/or ACK packets. However, a new data flow, depending on the network protocol associated with the flow, can simply be a data flow for which there is no corresponding flow object. For example, with UDP and GRE flows (where there is no explicit connection or handshake mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the last packet and the time of the current packet is greater than the threshold, the current packet is deemed part of a new flow. In another implementation, a background and/or separate process can periodically compare the last packet times associated with a flow to a threshold period of time and deem the flow terminated if the last packet time is beyond the threshold period of time. The termination of TCP connections is typically detected by identifying FIN packets; however, the timeout mechanisms discussed above can be used in situations where a FIN packet is not detected.

In one embodiment, a control block (flow) object contains a flow specification object including such attributes as pointers to the end system IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. Nos. 6,046,980 and U.S. 6,591,299, as well as others incorporated by reference herein, disclose classification of data flows for use in a packet-based communications environment. FIG. 2 illustrates the concept associated with inside and outside addresses, where network interface 71 is the "inside" network interface and network interface 72 is the "outside" network interface. As discussed above, in one embodiment, a flow specification object includes an "inside" and "outside" address relative to data compression device 130. See FIG. 1. For a TCP/IP packet, packet processor 92 can compute the inside and outside addresses based on the source and destination network addresses of the packet and the direction of the packet flow. Still further, packet processor 92 can also identify which host is the client and which host is the server for a given data flow and store this information in the flow specification or flow object. The identification of a server or client in a given transaction generally depends on the network protocols employed by the hosts. For example, in TCP flows, a client initiates a transaction by transmitting a SYN packet to initiate a TCP connection. Application traffic management device 130 can detect the SYN packet and note the source network address of the packet as the client host, and the destination address as the server host. One of ordinary skill in the art will recognize how to identify clients and servers in connection with other networking protocols.

In one embodiment, packet processor 92 creates and stores flow objects corresponding to data flows in flow database 135. In one embodiment, flow object attributes include a pointer to a corresponding flow specification object, as well as other flow state parameters, such as TCP connection status, timing of last packets in the inbound and outbound directions, speed information, apparent round trip time, packet count, etc. To facilitate operation of compression module 98, each flow object can also include compression state attributes, such as compression algorithm identifiers, remote tunnel endpoint information, and the like. Flow object attributes, in some implementations, further include at least one traffic class identifier (or pointer(s) thereto) associated with the data flow, as well as policy parameters (or pointers thereto) corresponding to the identified traffic class. In one embodiment, flow objects further include a list of traffic classes for which measurement data (maintained by measurement engine 140) associated with the data flow should be logged. In one embodiment, to facilitate identification of the flow and association of an existing flow object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding flow object. According to this embodiment, to identify whether a flow object exists for a given data flow, packet processor 92 hashes the values identified above and scans the hash table for a matching entry. If one exists, packet processor 92 associates the pointer to the corresponding flow object with the packets in the data flow.

A.2. Traffic Classification

As discussed above, traffic classification engine 96, in one implementation, is operative to classify data flows into one of a plurality of traffic classes. Traffic classification engine 96, in one implementation, comprises a plurality of service type identification modules, each of which correspond to a set of service types or network applications. Each service type identification module analyzes one or more packets in a given data flow to attempt to identify a service type corresponding to the flow. A service type, in one implementation, can be a network protocol, a service, or other network application. For example, one service type identification module can correspond to a network application, such as Citrix®, while another service type identification module can be dedicated to detecting Oracle® or PostgreSQL database traffic. Still other service type identification modules can classify more broadly-defined network applications, such as HTTP flows, FTP flows, ICMP flows, RTP flows, NNTP, SMTP, SSL, DICOM and the like. In one implementation, traffic classification engine 96 passes pointers to received packets to each service type identification module, which then inspect the packets stored in the buffer memory. In one implementation, each service type identification module has an associated packet count threshold (in the aggregate, packets from server to client, or client to server) after which it no longer attempts to classify a data flow. In one implementation, the packet count threshold will vary across the service type identification modules. For example, a service type identification module dedicated to classifying Citrix® traffic may be able to classify a data flow with certainty after three packets. In many instances, data compression device 130 may have to encounter more than one packet corresponding to a data flow in order to finally classify the data flow. For example, the initial TCP handshake packets may only reveal IP address, port numbers and protocol identifiers. While this information may be sufficient to identify HTTP traffic, for example, additional packets (such as data packets) may reveal a more specific network application, such as an accounting application or peer-to-peer file sharing application, that utilizes HTTP. Accordingly, in one implementation, each service type identification module responds to receiving a pointer to a packet by 1) reporting a matching service type identifier and the desire to inspect more packets in the flow (to possibly identify a more specific service type identifier); 2) reporting a matching service type and no interest in inspecting subsequent packets in the flow; 3) reporting no matching service type identifier and the desire to inspect more packets in the flow; and 4) reporting no matching service type and no interest in inspecting subsequent packets in the flow.

To allow for identification of service types (e.g., FTP, HTTP, etc.), traffic classification engine 96, in one embodiment, is supported by one to a plurality of service identification tables in a relational database that allow for identification of a particular service type (e.g., application, protocol, etc.) based on the attributes of a particular data flow. Of course, other suitable data structures can be used to support the identification of service types, such as a set of hard-coded instructions, an XML file, and the like. In one embodiment, a services table including the following fields: 1) service ID, 2) service aggregate (if any), 3) name of service, 4) service attributes (e.g., port number, outside IP address, etc.), and a 5) default bandwidth management policy. A service aggregate encompasses a combination of individual services (each including different matching criteria, such as different port numbers, etc.) corresponding to the service aggregate. When application traffic management device 130 encounters a new flow, the service type identification modules of traffic classification engine 96 analyze the data flow against the service attributes in their respective services tables to identify a service ID corresponding to the flow. In one embodiment, traffic classification engine 96 may identify more than one service ID associated with the flow. In this instance, traffic classification engine 96 associates the more/most specific service ID to the flow. For example, network traffic associated with a peer-to-peer file sharing service may be identified according to a network protocol, such as TCP or HTTP traffic, as well as higher level, application-specific traffic types such as the actual file sharing application itself (e.g., Napster, Morpheus, etc.). In this instance, traffic classification engine 96 associates the flow with the most specific service ID. As a further example, an RTSP application data flow can be further classified to RTSP-Broadcast or RTSP-REALNET-TCP in the middle of the flow after a particular signature in the packets is encountered. In one implementation, traffic classification engine 96 writes the identified service type ID into the control block (flow) object corresponding to the data flow.

As discussed more fully below, service type identification, in one implementation, is a preliminary operation to the classification of a data flow according to the hierarchical traffic classification scheme configured by a network administrator. For example, a traffic class maintained by traffic classification engine 96 may be configured to include matching rules based on the service IDs in the services table. For example, a matching rule directed to HTTP traffic may simply refer to the corresponding service ID, as opposed to the individual attributes that the service type identification modules uses to initially identify the service. This implementation allows for a variety of hierarchical traffic classification configurations, such as the configuration of child traffic classes that further classify HTTP traffic on the basis of a network application, a range of IP addresses, and the like. Still further, the service type identifiers can correspond to a specific network application (e.g., Napster, Citrix, NetIQ, Oracle, Skype, etc.) and more generally to network protocols or services, such as IP, TCP, HTTP, SOAP, XML, UDP, FTP, SMTP, FTP, UDP, etc.

A traffic class comprises a set of matching rules or attributes allowing for logical grouping of data flows that share the same characteristic or set of characteristics. In one implementation, the matching rules can correspond to the service type identifiers discussed above, as well as other data flow attributes, such as the network interface on which the packets are received by application traffic management device 130, whether the server is the inside or outside host (see above), non-standard and standard port numbers, host IP address or subnet, MAC address, application-specific strings, diffserv codes, MPLS tags, VLAN tags, and the like. In one embodiment, each traffic class has at least one attribute defining the criterion(ia) used for identifying a specific traffic class. In one implementation, the attributes defining a given traffic class can be based on explicitly presented attributes of one or more packets corresponding to a data flow (as discussed above), or be based on behavioral attributes of the end systems associated with the flow. The U.S. patent applications identified above disclose various network traffic classification mechanisms that can be incorporated into embodiments of the present invention. For example, a traffic class can be defined by configuring an attribute defining a particular IP address or subnet. Of course, a particular traffic class can be defined in relation to a plurality of related and/or orthogonal data flow attributes. U.S. Pat. Nos. 6,412,000 and 6,591,299, and U.S. patent application Ser. No. 10/039,992 describe some of the data flow attributes that may be used to define a traffic class, as well as the use of hierarchical classification structures to associate traffic classes to data flows. In one embodiment, application traffic management device 130 includes functionality allowing for classification of network traffic based on information from layers 2 to 7 of the OSI reference model. Application traffic management device 130 can be configured to include matching rules that define a plurality of network applications commonly found in enterprise networks, such as database applications, Citrix® flows, ERP applications, and the like. As discussed below, the matching rules or attributes for a traffic class may be based on various types of node behavior, such as the number of concurrent connections of the inside or outside host.

In one embodiment, application traffic management device 130 is configured to include a predefined set of traffic classes based upon a knowledge base gleaned from observation of common or known traffic types on current networks. Application traffic management device 130, in one embodiment, also allows an administrator to manually create a traffic class by specifying a set of matching attributes. As discussed above, administrator interface 150, in one embodiment, allows for selection of a traffic class and the configuration of traffic management policies for the selected traffic class. Administrator interface 150, in one embodiment, also allows for the selection and arrangement of traffic classes into hierarchical reference trees. In one embodiment, traffic classification engine 96 also stores traffic classes added by the traffic discovery module. Furthermore, as discussed below, application traffic management device 130 may also include traffic class discovery functionality that automatically adds traffic classes to traffic classification engine 96 in response to data flows traversing the device. Automatic network traffic discovery and classification (see below) is disclosed in U.S. Pat. Nos. 6,412,000, 6,457,051, and 6,591,299, which are incorporated herein by reference.

Traffic classification engine 96, in one implementation, stores traffic classes associated with data flows that traverse access link 21. Traffic classification engine 96, in one embodiment, stores the traffic classes and corresponding data (e.g., matching rules, policies, partition pointers, compression algorithm identifiers, etc.) related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet. U.S. application Ser. No. 10/334,467, as well as other patents and patent applications identified above, disclose how traffic classification engine 96 traverses the hierarchical tree to match a data flow to a leaf traffic class node.

In one embodiment, the root traffic classifications are "/Inbound" and "/Outbound" data flows. Any data flow not explicitly classified is classified as "/Inbound/Default" or "/Outbound/Default". In other implementations, the concept of "inbound" and "outbound" is replaced by a set of policies corresponding to pairs of network interfaces, such as interfaces 71 and 72, and the direction of packet traffic. For example, packets flowing from network interface 71 to network interface 72 (and vice versa) can be classified on that basis to eliminate any potential restrictions on classification of data flows in different network topologies. A "LocalHost" traffic class, in one implementation, corresponds to packets and data flows destined for application traffic management device 130, such as requests for stored measurement data, traffic class mapping packets, or device configuration changes. In one embodiment, traffic classification engine 96 attempts to match to a leaf traffic class node before proceeding to remaining traffic class nodes in the hierarchical configuration. If a traffic class is found, the traffic classification engine 96 stops the instant search process and returns the identified traffic classification. Of course, one skilled in the art will recognize that alternative ways for traversing the hierarchical traffic class configuration can be implemented. For example, traffic classification engine 96 may be configured to traverse all traffic class nodes at a given level before proceeding to lower levels of the traffic classification tree.

In one embodiment, administrator interface 150 displays the traffic class tree and allows for selection of a traffic class and the configuration of policy for that traffic class. Administrator interface 150 also allows for the arrangement of traffic classes into a hierarchical classification tree. Application traffic management device 130 further allows an administrator to manually create a traffic class by specifying a set of matching rules and also automatically creates traffic classes by monitoring network traffic across access link 21 and classifying data flows according to a set of criteria to create matching rules for each traffic type. In one embodiment, each traffic class node includes a traffic class identifier; at least one traffic class (matching) attribute; at least one policy parameter (e.g., a bandwidth utilization control parameter, etc.), a pointer field reserved for pointers to one to a plurality of child traffic classes. In one embodiment, traffic classification engine 96 implements a reference tree classification model wherein separate traffic classification trees can be embedded in traffic class nodes of a given traffic classification tree. U.S. application Ser. No. 10/236,149, incorporated by reference herein, discloses the use and implementation of embeddable reference trees.

A.3. Data Rate Control

As discussed above, rate control module 94 applies the traffic policies identified in the control block object corresponding to various flows. For example, rate control module 94, in one, implementation, is operative to enforce bandwidth utilization controls on data flows traversing access link 21. A bandwidth utilization control for a particular data flow can comprise an aggregate control bandwidth utilization control, a per-flow bandwidth utilization control, or a combination of the two. Rate control module 94 can use any suitable functionality to enforce bandwidth utilization controls known in the art, including, but not Limited to weighted fair queuing, class-based weighted fair queuing, Committed Access Rate (CAR) and "leaky bucket" techniques. Rate control module 94 may incorporate any or a subset of the TCP rate control functionality described in the cross-referenced U.S. patents and/or patent applications set forth above for controlling the rate of data flows. Data compression device 130, however, can also be configured to implement a variety of different policy types, such as security policies, admission control policies, redirection policies, caching policies, transcoding policies, and network address translation (NAT) policies. Of course, one of ordinary skill in the art will recognize that other policy types can be incorporated into embodiments of the present invention.

A.3.a. Aggregate Bandwidth Utilization Control

An aggregate bandwidth utilization control operates to manage bandwidth for aggregate data flows associated with a traffic class. An aggregate bandwidth utilization control can be configured to essentially partition the available bandwidth corresponding to a given access link. For example, a partition can be configured to protect a network traffic class by guaranteeing a defined amount of bandwidth and/or limit a network traffic class by placing a cap on the amount of bandwidth a traffic class can consume. Such partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions can be arranged in a hierarchy—that is, partitions can contain partitions. For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application traffic class, and sub-divide this parent partition into a large burstable child partition for its human resources department and a smaller burstable child partition for the accounting department. U.S. patent application Ser. No. 10/108,085 includes a discussion of methods for implementing partitions, as well as novel solution for implementing partitions arranged in a hierarchical allocation scheme.

In one embodiment, a partition is created by selecting a traffic class and configuring a partition for it. As discussed above, configurable partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts.

Figure 3:
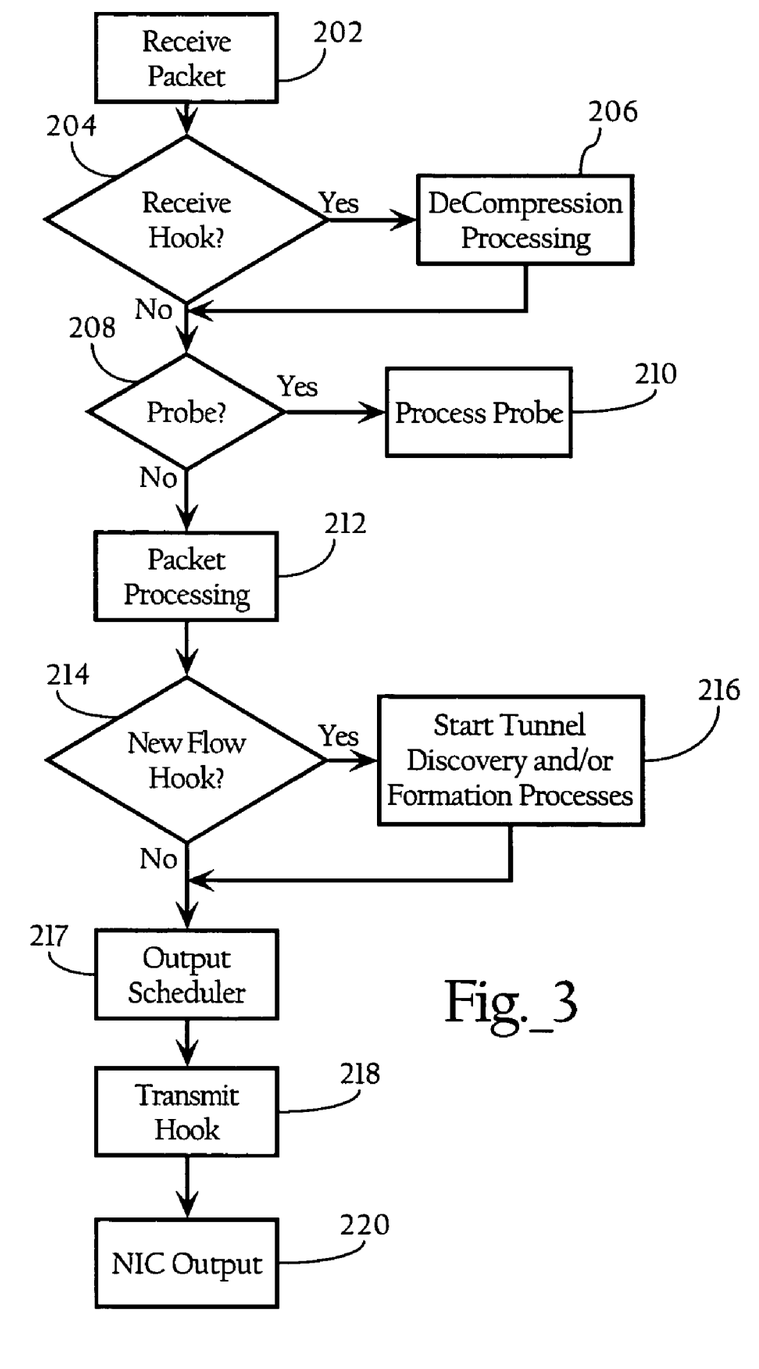
FIG. 3 is a flow chart diagram showing a method, according to one implementation of the present invention, directed to processing data flows.

Still further, in one implementation discussed below, rate control module 94 in a first process operates to place packets on a corresponding partition queue depending on a partition associated with a traffic class or network application corresponding to the flow. A separate, output scheduling process arbitrates among the partition queues selecting packets for output. As FIG. 3 illustrates, certain compression-related operations are performed on packets after the packets have been placed onto partition queues, and after the output scheduler pops the packets from the partition queues.

A.3.b. Per-Flow Bandwidth Utilization Controls

Traffic policy module 84 is also operative to enforce per-flow bandwidth utilization controls on traffic across access link 21. Whereas aggregate bandwidth utilization controls (e.g., partitions, above) allow for control of aggregate data flows associated with a traffic class, per-flow bandwidth utilization controls allow for control of individual data flows. In one embodiment, traffic policy module 84 supports different bandwidth utilization control types, including, but not limited to, priority policies, rate policies, and discard policies. A priority policy determines how individual data flows associated with a traffic class are treated relative to data flows associated with other traffic classes. A rate policy controls the rate of data flows, for example, to smooth bursty traffic, such as HTTP traffic, in order to prevent a TCP end system from sending data packets at rates higher than access link 21 allows, thereby reducing queuing in router buffers and improving overall efficiency. U.S. patent application Ser. No. 08/742,994 now U.S. Pat. No. 6,038,216, incorporated by reference above, discloses methods and systems allowing for explicit data rate control in a packet-based network environment to improve the efficiency of data transfers. Similarly, U.S. Pat. No. 6,018,516, incorporated by reference above, methods and systems directed to minimizing unneeded retransmission of packets in a packet-based network environment. A rate policy can be configured to establish a minimum rate for each flow, allow for prioritized access to excess available bandwidth, and/or set limits on total bandwidth that the flow can consume. A discard policy causes traffic policy module 84 to discard or drop data packets or flows associated with a particular traffic class. Other policy types include redirection policies where an inbound request designating a particular resource, for example, is redirected to another server.

A.4. Compression and Tunneling

Compression module 98 is operative to establish and maintain compression tunnels with compatible routing nodes or other network devices in a communications path. In one embodiment, compression module 98 includes data transformation functionality, such as data compression or caching functionality, and tunneling functionality based on standard transport and encapsulation protocols. In one embodiment, compression module 98 includes a variety of compression tunnel capabilities, including the ability to employ different transport and encapsulation protocols, as well as different data compression algorithms.

Compression functionality generally transforms data packets from a first state to a second, smaller state. Compatible de-compression functionality is operative to transform the data from the second smaller state to substantially the first state. For example, according to some algorithms and data formats, de-compression does not recover all of the original data. Transformation functionality may include a variety of types and protocols. For example, compression module 98 may include compression and/or decompression functionality, caching functionality, and encryption and/or decryption functionality, all of a variety of types and configurations. For example, compression module 98 may include a plurality of data compression capabilities, such as compression functionality optimized for different kinds of data (e.g., text files, image files, audio files, etc.) or network application types. Data transformation can be performed on just the packet data, the header data, or on the entire packet depending on the implementation. In one implementation, compression module 98 may apply different compression techniques to the headers and payloads of individual packets. In addition, compression module 98 can operate on packets individually, or collect packets and transform them on an aggregate basis. In addition, compression module 98 may operate to transform data from one compression format to another compression format, such as converting image data files from one format to another.

Compression module 98 is also operative to handle the path between data compression device 130 and the tunnel partner corresponding to the path, using encapsulation and transport technologies, such as Generic Routing Encapsulation (GRE) protocol (RFC 2890), IP in IP Tunneling protocol (RFC 1853), and/or any other suitable protocol. Compression module 98 also includes tunnel management functionality allowing for maintenance of tunnel state information, as well as recovery functionality that handles loss of tunnels, routing failures and other transmission errors, such as lost or out-of-order packet transmissions (if applicable to the compression protocol).

In one embodiment, compression module 98 is operative to probe communication paths for routing nodes or other network devices that include compatible compression and tunneling capabilities. For example, U.S. patent application Ser. No. 10/015,826, incorporated by reference herein, discloses methods for probing a communications path for compatible tunnel partners. Using this technology, data compression device 130*a* (see FIG. 1), for example, may transmit probe requests along the communications path to end system 28, which may be intercepted by data compression device 130*b*. As discussed in the above-identified application, data compression device 130*a* processes probe responses to identify an appropriate compression tunnel partner, such as data compression device 130*b*.

Compression module 98, in one implementation, comprises a plurality of compression algorithm sub-modules each corresponding to a given compression algorithm or a given implementation of a compression algorithm. In one implementation, each compression algorithm sub-module has associated with it a set of functions to handle initialization, compression, de-compression, backup (optional) and close. Suitable compression algorithms include LZ77, LZ78, Lempel-Ziv-Welch (LZW), deflate (zlib), and CNA algorithms. In one implementation, compression module 98 maintains a compression algorithm table listing the details of each supported compression algorithm. In one implementation, the compression algorithm table is indexed by an algorithm's compression type or some other unique identifier. A given compression algorithm can be applied to traffic corresponding to different network applications or other traffic classes by changing the configuration of the corresponding traffic class object maintained by traffic classification engine to identify the desired compression algorithm as the active compression algorithm. As discussed more fully below, compression module 98 is operative to apply an active compression algorithm to the data flows associated with a given network application, and one or more passive algorithms to the data flows. The relative performance of the active and passive compression algorithms, in one implementation, can be evaluated on a network application basis to select a new active compression algorithm.

As discussed above, compression algorithm is the particular method used to shrink the size of transferred traffic. Most compression algorithms involve spotting repeated sequences in the data and storing these sequences for quick look-up searches later. A compression dictionary is a location where an algorithm stores its data sequences, predictions, shortened substitutions, and/or any other data it needs to do its job. A compression dictionary is a compilation of common patterns of characters and the shorter strings with which they are replaced when the data is sent across a network. Associated with each compression dictionary is a compression algorithm, such as Lempel-Ziv/Huffman. Compression dictionaries come in different sizes: the smaller dictionaries are faster at compressing data while the Larger dictionaries achieve higher compression ratios. In one implementation, compression module 98 may maintain separate dictionaries for each tunnel partner it discovers in the case of dynamic compression dictionaries. Network traffic must be decompressed with the same dictionary with which it was compressed. Accordingly, before compressing, compression module 98 may check with its partner to make sure that the correct dictionary is available. If that dictionary is not available, it will took for one that they both have and will use that common dictionary to compress the data. In one implementation, dictionary selection is handled during the compression tunnel discovery phase.

In addition, compression module 98 also includes a flow table that keeps track of the active data flows on which compression module 98 operates. In one implementation, the flow table includes the following fields: 1) flow ID; 2) tunnel address; 3) active compression ID, 4) passive compression ID; and 5) network application. Flow identifier is a string or hashed value that identifies the flow (see Section A.1., above). The tunnel address is the IP or network address of the remote tunnel endpoint. Dictionary identifies the active dictionary used to compress the data packets in the flow. Network application refers to the network application corresponding to the data flow. The active and passive compression IDs refer to the active and passive compression algorithms currently applied to the data flow.

Compression module 98, in one implementation, selects the compression algorithm that is applied to a given data flow depending on the network application into which the data flow is classified. Still further, as discussed herein, compression module 98 is operative to apply to the data flows associated with select network applications a so-called "active" compression algorithm, and a so-called "passive" compression algorithm. In one implementation, compression module 98 copies each incoming packet and sends the original packet to the active compression algorithm, and a copy to the passive compression algorithm. Both compression algorithm modules operate on the packets as normal; however, the compressed packets resulting from operation of the passive compression algorithm are discarded after the compression statistics have been computed. That is, in one implementation, compression module 98 maintains, on a network application basis, the size of the packets prior to compression by a given compression sub-module, and after compression by the compression sub-module. In one implementation, these raw compression statistics can be maintained by measurement engine 140 and accessed by a separate evaluation process. From these statistics, a compression ratio can be computed for each compression algorithm on a per-network-application basis. These compression ratios allow compression module 98 to examine the relative performance advantages between the active and passive compression algorithms applied to a given network application over a given time interval.

In one implementation, compression module 98 also maintains a network application table that maintains the current active and passive compression algorithms associated with each network application. In one implementation, the network application table also contains a flag indicating whether the active and passive compression functionality has been turned on or off for a given network application. In one implementation, each flow object has a corresponding flag that compression module 98 checks to determine whether to apply an active and passive compression algorithm to the data flow. As discussed in more detail below, a process operates on a periodic basis to evaluate the compression ratios between the active and passive compression algorithms that were applied to one or more network applications. As to each network application, the process chooses the better performing compression algorithm as the current active compression algorithm, and selects a new compression algorithm for the passive compression algorithm. Accordingly, as network application behavior changes, the compression algorithms applied by compression module 98 can automatically change as well to improve achievable results.

A.3.a. Overall Process Flow Including Compression Functionality

FIG. 3 provides a method, according to one implementation of the present invention, illustrating how data compression device 130 applies the compression and other functions to packets traversing access link 21. In one implementation, integration of compression functionality to other processing on the packet path is accomplished using compression hooks that check if a given packet is to be operated on, intercepted or ignored. In one implementation, the compression receive hook intercepts received tunneled packets, such as IPCOMP packets (202, 204). Tunneled packets are passed to compression module 98, which decompresses the packets and re-injects them on the packet path (206). As FIG. 3 illustrates, incoming packets are also checked to determine whether they are probe packets (208) transmitted by a remote network device in an effort to discover a tunnel partner and establish a compression tunnel. If so, the probe packet is also passed to compression module 98 for appropriate processing (210). Data compression device 130 then processes the packets according to its standard packet processing mechanisms (212) as discussed more fully below. For example, data compression device 130 may include network application traffic management functionality that is operative to manage bandwidth utilization, or accelerate network traffic, across the access link, in addition to the compression functionality described herein.

After packet processing, a new flow hook checks to determine whether the packet represents part of a new flow and/or whether identified network application associated with the flow has changed. The new flow hook may also trigger tunnel discovery and/or formation operations if the flow data associated with the packet warrants it (see FIG. 4). As discussed in more detail below, the new flow hook also provides a flow and its associated packets an active and passive compression id assignment (if possible). Compression ids are used to index into compression entries that contain tunnel partner information, compression encoding information, and the like. An output scheduler then operates on packets placed in various queues by rate control module 94. After processing by the output scheduler, a compression transmit hook intercepts compressible packets (218), which are operated on by compression module 98, prior to the packets being read onto the transmit queues of the network interfaces 71 or 72 (220).

Figure 4:
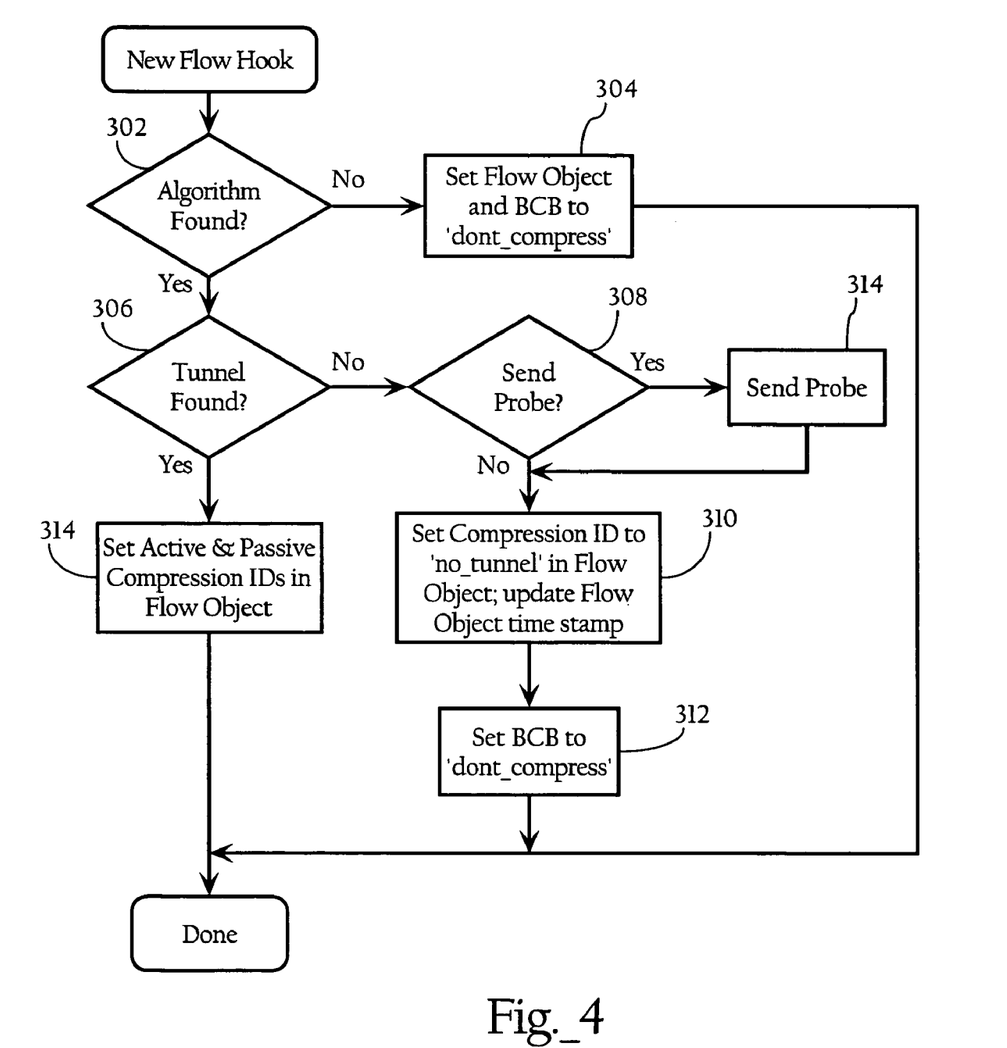
FIG. 4 is a flow chart diagram illustrating operation of a new flow hook according to one implementation of the present invention.

FIG. 4 illustrates operation of the new flow hook according to one implementation of the present invention. In one implementation, the new flow hook first determines whether data flow has been sufficiently classified or analyzed such that active and passive compression algorithms can be identified for the data flow. As discussed above, data compression device 130 applies different compression algorithms to different classes of network traffic. For example, in one implementation, compression module 98 maintains a network application table that identifies the active and passive compression algorithms to be applied to a given network application. In many implementations, data compression device 130 does not compress all types of network traffic. Furthermore, it may take more than one packet to fully determine a network application for a flow and, therefore, to determine whether a compression algorithm can be applied. Accordingly, when a network application is identified, the flow object generally contains a service type identifier for the network application. The new flow hook uses the service type identifier to determine whether a corresponding entry exists in the network application table and, if so, sets the active and passive compression ids in the flow object. If the new flow hook does not find an active compression algorithm for the data flow, it sets the active compression ID field in the flow object corresponding to the flow, and the active compression ID in the packet wrapper (BCB) corresponding to the packet, to 'dont_compress' (304). Packets with active compression IDs set to "dont_compress" are ignored by the transmit hook and are not sent through a compression tunnel. Otherwise, the new flow hook then determines whether a tunnel partner is available for the data flow (306). If there is no current tunnel that can be used for the flow, the new flow hook determines whether another probe request should be sent along the communications path to the destination host (308, 314). The new flow hook then sets the active compression ID in the flow object to "no_tunnel" (310), and sets the active compression ID in the packet wrapper to "dont_compress" (312).

Figure 5:
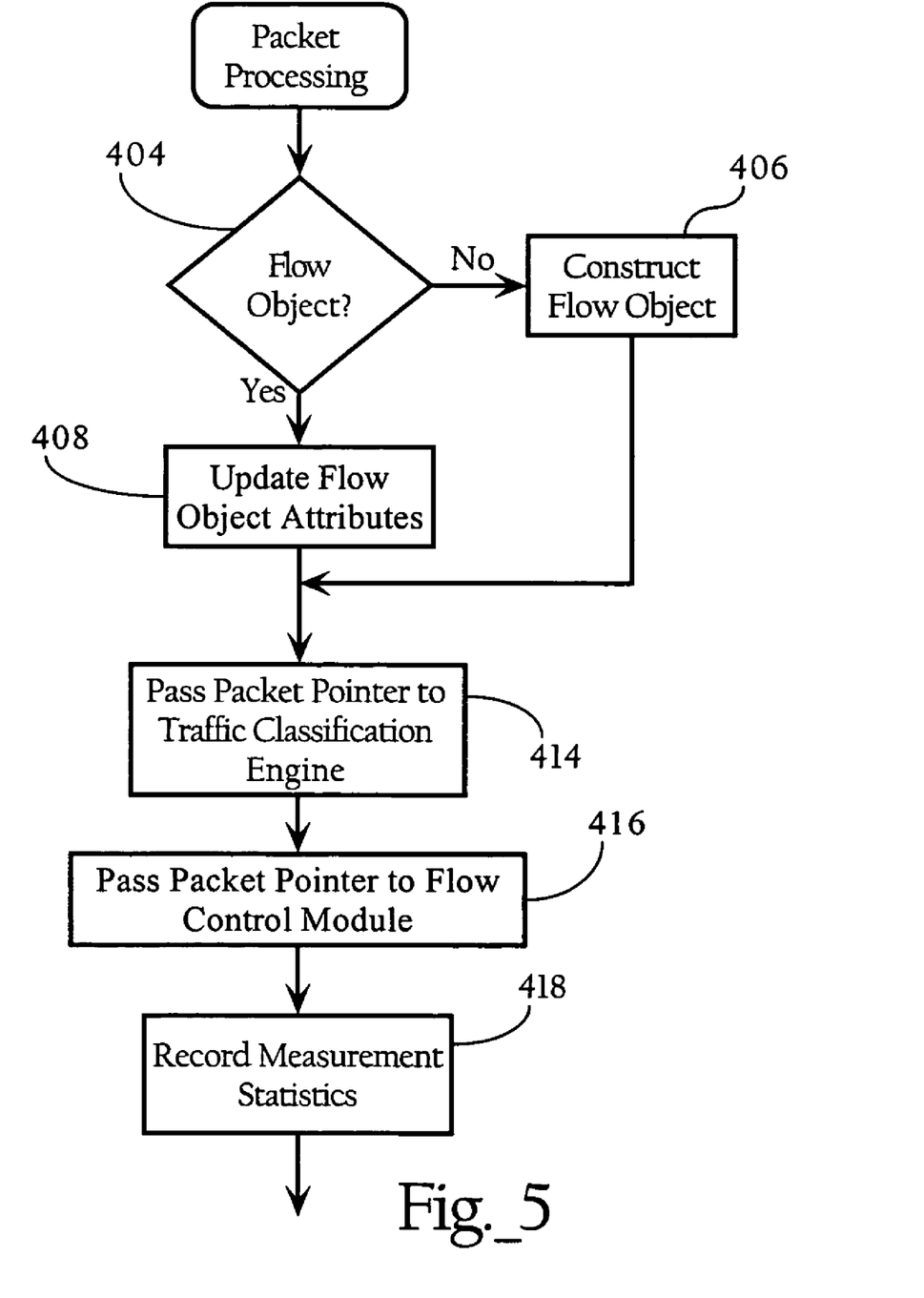
FIG. 5 is a flow chart diagram illustrating a sequence of packet processing operations, according to one implementation of the invention.

FIG. 5 illustrates for didactic purposes various operations that may be performed on the packets traversing data compression device 130, according to one implementation of the present invention. In one embodiment, packet processor 92, in response to a received data packet, determines whether flow database 135 contains an existing control block object corresponding to the data flow (404) (see Section A.1., supra). If no control block object corresponds to the data packet, packet processor 92 constructs a control block object including attributes characterizing the data flow, such as source address, destination address, etc. (406) (see above). In one embodiment, packet processor 92 analyzes the source and destination IP addresses in the packet header and scans host database 134 for matching entries. If no matching entries exist, packet processor 92 creates new entries for the source and destination IP addresses. As discussed above, in one embodiment, a control block object contains a flow specification object including such attributes as pointers to the "inside" and "outside" IP addresses in host database 134, as well as other flow specification parameters, such as inside and outside port numbers, protocol type, pointers to variable-length information in a dynamic memory pool, and other parameters characterizing the data flow.

As FIG. 5 illustrates, packet processor 92 updates, for existing data flows, attributes of the flow object in response to the packet such as the packet count, last packet time, and the like (408). Packet processor 92 can also perform other operations, such as analyzing the packets for connection state information. For example, packet processor 92 can inspect various TCP flags to determine whether the received packet is part of a new data flow or represents a change to an existing data flow (such as the first data packet after the TCP handshake). Methods for determining new data flows and assigning packets to existing data flows are well known in the art and also depend on the particular transport layer protocol employed. For a TCP packet, packet processor 92 can determine a new data flow by detecting SYN and/or SYN/ACK packets. However, a new data flow can simply be a data flow for which there is no corresponding control block object in flow database 135. In addition, with UDP and GRE flows (where there is no explicit connection mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the latest packet and the time of the last packet is greater than the threshold, the new packet is deemed part of a new flow. In another embodiment, a separate process monitors the last packet times associated with UDP, GRE and similar flow types to detect termination of a given flow.

As FIG. 5 illustrates, packet processor 92 then passes a pointer to the packet, in one implementation, to traffic classification engine 96, which operates as discussed above to determine service IDs for, and otherwise classify, the data flow (414). Lastly, the packet is passed to rate control module 94 (418), which performs rate control operations on the data packets, such as placing the packet on a partition queue, performing TCP rate control operations, and the like. As FIG. 5 illustrates, data compression device 130 may also perform other operations in response to arrival of the packet. For example, measurement engine 140 may record certain measurement variables on an aggregate or per-traffic class basis (418).

A.3.b. Evaluation of Active and Passive Compression Algorithms

Figure 6:
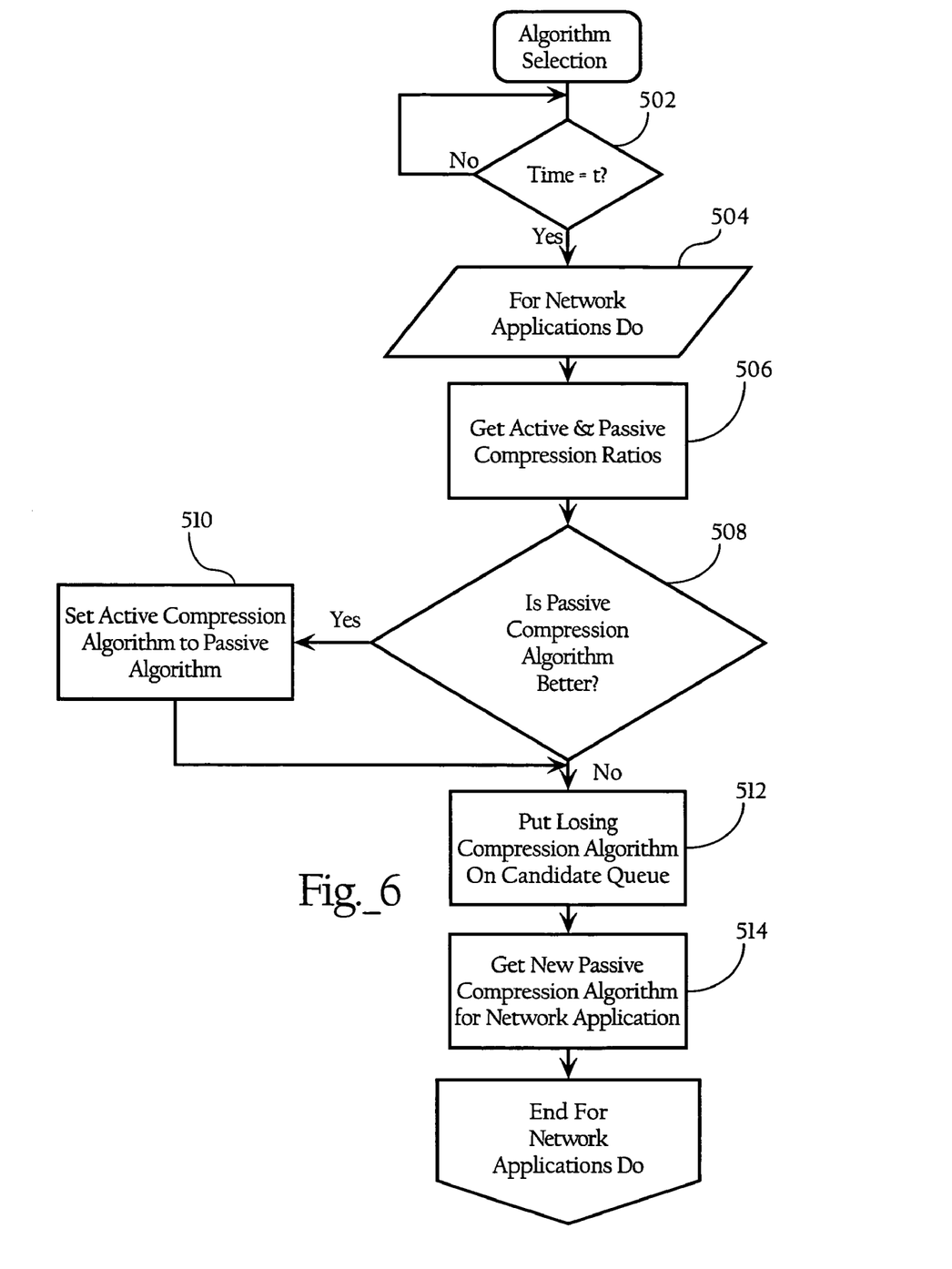
FIG. 6 is a flow chart diagram providing a method, according to one implementation of the present invention, directed to dynamically selecting compression algorithms for one or more network applications.

FIG. 6 illustrates a process flow, according to one implementation of the present invention, directed to adjusting the active and passive compression algorithms associated with one or more network applications in the network application table maintained by compression module 98. In one implementation, compression module 98 includes a compression algorithm selection daemon that operates at periodic intervals (see FIG. 6, 502). As FIG. 6 illustrates, the compression selection daemon, for each network application (504), obtains the compression ratios for the active and passive compression algorithms over the last interval (506). In the implementation shown, if the compression ratios indicate that the passive compression algorithm would have performed better than the currently active compression algorithm (508), the compression algorithm daemon sets the active compression algorithm for the given network application to the passive compression algorithm (510).

In one implementation, the compression algorithm selection daemon maintains a queue of candidate compression algorithms, among which it arbitrates to select a new passive compression algorithm for the next time interval. The list of candidate compression algorithms, in one implementation, varies depending on the network application, as some compression algorithms may not be suitable. In one implementation, the compression algorithm with the inferior compression ratio over the last interval is placed on the queue of candidate compression algorithms (512). The compression algorithm selection daemon then pops the first compression algorithm from the queue and sets it as the new passive compression algorithm (514). As FIG. 6 illustrates, the compression algorithm selection daemon repeats this process for all applicable network applications.

As FIG. 6 illustrates, data compression device 130, in the implementation shown, essentially conducts a pair-wise evaluation of compression algorithms for a given network application, and selects the better performing compression algorithm at the end of an analysis interval. In addition, data compression device 130 cycles through a queue of compression algorithms during normal operation. The use of pair-wise evaluations, in one implementation, is intended to conserve CPU resources in that running more than two compression algorithms simultaneously for a given data flow and network application may degrade system performance and data throughput. Accordingly, the arrangement set forth above allows all compression algorithms to be compared. In other implementations, more than one passive compression algorithm may be selected and simultaneously evaluated, depending on desired data throughput parameters, device processing power, and available system resources (e.g., such as parallel processors, etc.).

Still further, the evaluation of active and passive compression algorithms, in one implementation, can be turned on and off for specified network applications. In some implementations, the evaluation of active and passive compression algorithms is by default turned off for all network applications and used on a temporary basis to assist in the selection of a compression algorithm for a network application of interest. For example, embodiments of the present invention can be configured to allow a network administrator to select a network application and use the functionality discussed above to evaluate which compression algorithm performs the best over some evaluation period. For example, the compression module 98 may maintain statistics such as the number of intervals during which each compression algorithm was selected as the active compression algorithm. The compression algorithm with the largest number of intervals is most likely the best performing compression algorithm for that network application. After the evaluation period, the network administrator may turn off the evaluation functionality as to that network application and configure the best performing compression algorithm as the active compression algorithm for that network application.

Lastly, although the present invention has been described as operating in connection with end systems and networks employing the TCP, IP and Ethernet protocols, the present invention has application in computer network environments employing any suitable transport layer, network layer and link layer protocols. Moreover, while the present invention has been described as operating in connection with the partitioning mechanism disclosed in U.S. application Ser. No. 10/108,085, the present invention can be used in connection with any suitable partitioning mechanism. Still further, the present invention can be used in connection with a wide variety of compression algorithms. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A data compression device, comprising
at least one network interface;
a network traffic compression module comprising a plurality of compression algorithm sub-modules each implementing a compression algorithm, wherein the network traffic compression module is operably coupled to the at least one network interface, and operative, in an active compression mode, to
establish compression tunnels with a remote network device in the communications path to one or more destination hosts;
intercept outgoing data packets to the one or more destination hosts;
compress the outgoing data packets using a first compression algorithm;
maintain compression statistics characterizing the operation of the first compression algorithm;
and, wherein the network traffic compression module is further operative, in a passive compression mode, to
copy the outgoing data packets;
compress the copied outgoing data packets using a second compression algorithm;
maintain compression statistics characterizing the operation of the second compression algorithm;
discard the packets resulting from the second compression algorithm; and wherein data compression device is operative to
compare the compression statistics associated with the first and second compression algorithms;
select a compression algorithm for the active compression mode based on a comparison of the compression statistics; and
select a new compression algorithm for the passive compression mode after the comparison of the compression statistics.

2. The apparatus of claim 1 wherein the compression statistics comprise compression ratios.

3. The data compression device of claim 1 further comprising
a tunnel probing module operative to
dynamically probe a communications path to a destination host for at least one network device having compression capabilities; and
establish a compression tunnel with an identified network device in the communications path.

4. The apparatus of claim 3 wherein the tunnel probing module is operative to
transmit probe requests along the communications path to the destination host; and
receive probe responses from network devices in the communications path to the destination host.

5. A data compression device, comprising
at least one network interface;
a network traffic compression module comprising a plurality of compression algorithm sub-modules each implementing a compression algorithm, wherein the network traffic compression module is operably coupled to the at least one network interface, and operative, in an active compression mode, to establish compression tunnels with a remote network device in the communications path to one or more destination hosts;
intercept outgoing data packets to the one or more destination hosts;
compress the outgoing data packets using a first compression algorithm;
maintain compression statistics characterizing the operation of the first compression algorithm;
and, wherein the network traffic compression module is further operative, in a passive compression mode, to
copy the outgoing data packets;
compress the copied outgoing data packets using a second compression algorithm;
maintain compression statistics characterizing the operation of the second compression algorithm;
discard the packets resulting from the second compression algorithm; and
wherein data compression device is operative to
compare, on a periodic basis, the compression statistics associated with the first and second compression algorithms;
select a compression algorithm from the active and passive compression algorithms for the active compression mode based on a comparison of the compression statistics; and
select a new compression algorithm for the passive compression mode after the comparison of the compression statistics.

6. An adaptive data compression device, comprising
at least one network interface;
a network traffic identification module operative to match data flows to a network application from a plurality of network applications;
a network application data structure containing at least one identifier corresponding to one of the plurality of network applications in association with an active compression algorithm and a passive compression algorithm;
a network traffic compression module comprising a plurality of compression algorithm sub-modules each implementing a compression algorithm, wherein the network traffic compression module is operably coupled to the at least one network interface, and operative, in an active compression mode, to establish compression tunnels with a remote network device in the communications path to one or more destination hosts;
intercept outgoing data packets to the one or more destination hosts;
compress the outgoing data packets of a data flow using a first compression algorithm, wherein the first algorithm is selected based on the active compression algorithm identified in the network application data structure corresponding to the network application matched to the data flow;
maintain a compression ratio characterizing the operation of the first compression algorithm;
and, wherein the network traffic compression module is further operative, in a passive compression mode, to
copy the outgoing data packets;
compress the copied outgoing data packets using a second compression algorithm, wherein the second algorithm is selected based on the passive compression algorithm identified in the network application data structure corresponding to the network application matched to the data flow;
maintain a compression ratio characterizing the operation of the second compression algorithm;
discard the packets resulting from the second compression algorithm; and wherein data compression device is operative to compare the compression ratios associated with the first and second compression algorithms.

7. The data compression device of claim 6 wherein the data compression device is further operative to select a compression algorithm for the active compression mode based on a comparison of the compression ratios.

8. The data compression device of claim 7 wherein the data compression device is further operative to select a new compression algorithm for the passive compression mode after the comparison of the compression ratios.

9. The data compression device of claim 6 wherein the data compression device is further operative, on a periodic basis, to select a compression algorithm from the active and passive compression algorithms for the active compression mode based on a comparison of the compression ratios.

10. The data compression device of claim 9 wherein the data compression device is further operative to select a new compression algorithm for the passive compression mode after the comparison of the compression ratios.

* * * * *